United States Patent [19]

Lanigan Jr. et al.

[11] Patent Number: 4,877,365

[45] Date of Patent: Oct. 31, 1989

[54] SIDE SHIFT GRAPPLER

[75] Inventors: John J. Lanigan Jr., Lynwood; Myron Glickman, Morton Grove; Bernard A. Ermel, Clarendon Hills, all of Ill.

[73] Assignee: Mi-Jack Products Inc., Northbrook, Ill.

[21] Appl. No.: 920,792

[22] Filed: Oct. 20, 1986

[51] Int. Cl.[4] .................... B60P 1/64

[52] U.S. Cl. .................... 414/459; 212/209; 212/208; 212/218; 212/220; 212/221; 414/392; 414/399; 414/460; 414/663

[58] Field of Search .................... 414/786, 458, 459, 460, 414/391, 392, 399, 607, 626, 461, 663; 212/209, 218, 220, 221, 208, 213, 219; 901/16; 187/9 R

[56] References Cited

U.S. PATENT DOCUMENTS

| | | | |
|---|---|---|---|
| 2,424,899 | 7/1947 | Priester | 212/219 |
| 3,120,316 | 2/1964 | Luchford | 212/218 X |
| 3,251,496 | 5/1966 | Lamer et al. | 414/459 |
| 3,558,172 | 1/1971 | Lamer et al. | 414/459 |
| 3,637,210 | 1/1972 | Brantley | 212/208 X |
| 3,645,406 | 2/1972 | Brazell | 212/220 X |

FOREIGN PATENT DOCUMENTS

| | | | |
|---|---|---|---|
| 6806017 | 10/1968 | Netherlands | 212/219 |
| 1189788 | 11/1985 | U.S.S.R. | 212/209 |

*Primary Examiner*—Frank E. Werner
*Attorney, Agent, or Firm*—Robert A. Brown

[57] ABSTRACT

A crane and lift apparatus for controlling the operation of primary hoist and bridge apparatus, and gantry drive functions of the equipment. There is provided a side shift grappler apparatus to handle or pick up a truck trailer vehicle loaded with two containers and transfer the load from a roadway to a flat bed railroad car. The apparatus is adaptable to adjust or position the loaded truck trailer vehicle on the flat bed railroad car so as to place the fifth wheel of the trailer vehicle over and about the mounting stanchion of the flat bed railroad car for secure attachment thereat. The apparatus avoids the need to move the crane apparatus for only a relatively slight adjustment for positioning a loaded truck trailer on a flat bed railroad car.

8 Claims, 3 Drawing Sheets

FIG. 2
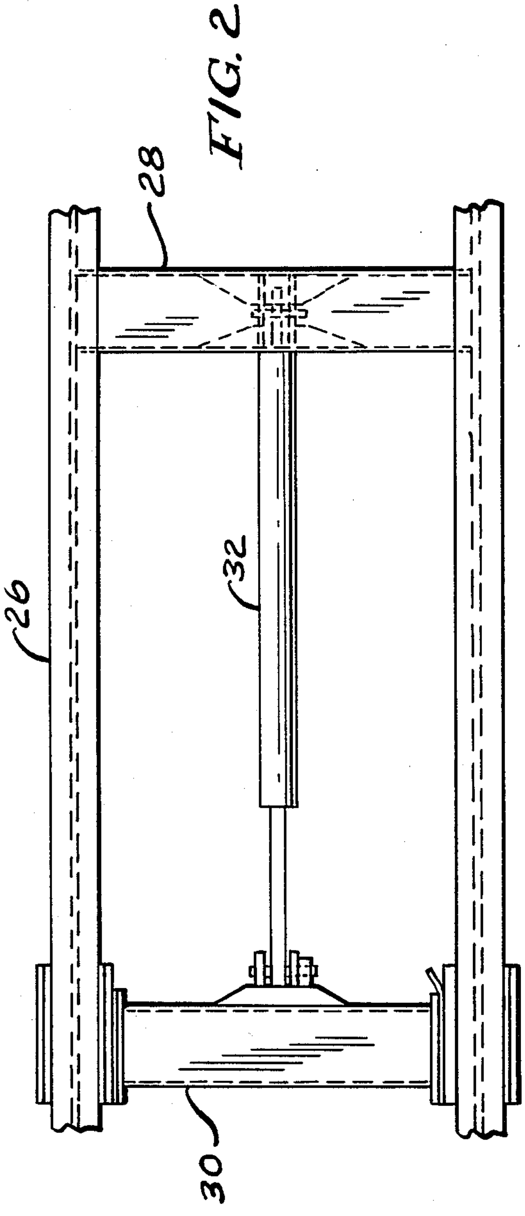
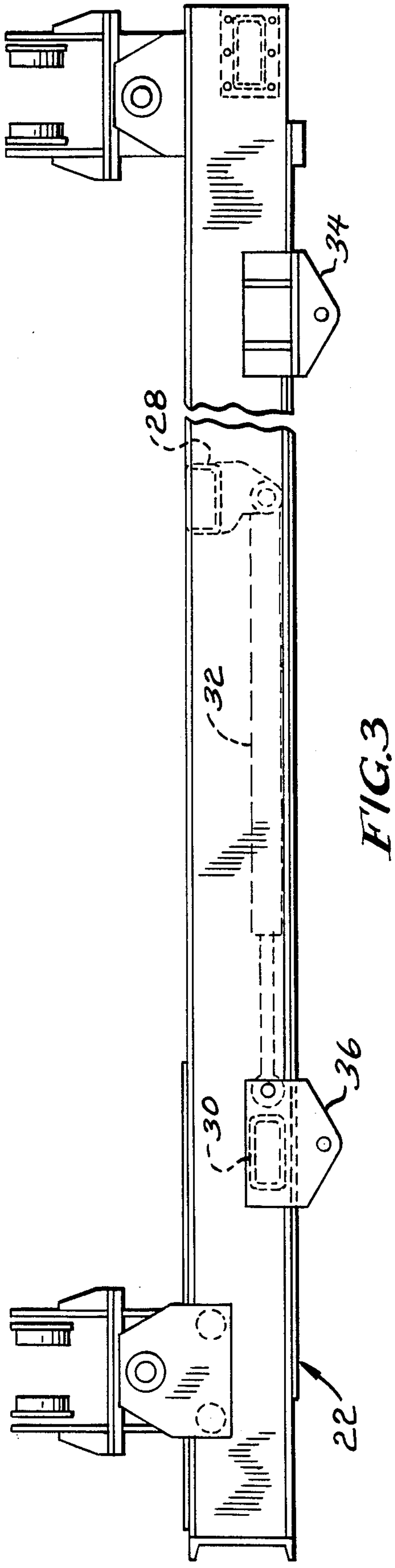
FIG. 3

SIDE SHIFT GRAPPLER

BACKGROUND OF THE INVENTION

The present invention relates generally to the handling of transport containers and, more particularly, is concerned with an apparatus and method for lifting, transporting, and controlling the positioning of large containers through the use of a side shift grappler.

DESCRIPTION OF THE PRIOR ART

In recent years, the use of large transport containers of several standardized forms has gained widespread use in industry. These containers permit the efficient transfer of cargo from ships to transporting vehicles, between different transporting vehicles, and to and from storage facilities. Because of the large size of the cargo containers, it has been necessary to develop equipment having the capability of effectively handling the heavy loads required for their lifting and transport. One common apparatus for lifting and transporting containers from place to place is in the form of large, self-powered gantry cranes having several separate powered functions. The crane must deliver power to drive wheels, steering mechanisms and brakes. The equipment must also be capable of moving interconnected stabilizing or bridge beams for positioning over the loads to be carried and of operating a hoist mechanism to raise and lower the containers.

SUMMARY OF THE INVENTION

Therefore, it is a primary object of the present invention to provide a lifting apparatus that is stable during vertical movement between ground level and the uppermost horizontal beam structure of a crane.

It is a further object of the present invention to provide a lifting apparatus that includes first controlled primary vertical movement and a separately controlled secondary horizontal movement of containers.

An additional object of the present invention is to provide a lifting apparatus capable of raising and lowering containers from ground level in substantially rectilinear vertical movement.

It is still a further object of the present invention to provide a lifting apparatus having a stabilizing beam assembly for movement in a first vertical direction, a first frame assembly for movement in a horizontal direction, and a side shift frame assembly for movement in a supplemental horizontal direction.

These and other objects are achieved in accordance with the present invention wherein there is provided an improved means and lift apparatus having side shift grappler means adapted to connect with and control vertical movement of containers so that optimum efficiency is achieved in moving containers from one location to another location. The side shift grappler apparatus includes an upper frame assembly adaptable to move horizontally over a plurality of stacks of containers and also be raised or lowered in a first vertical direction, a lower frame assembly depending from and movable horizontal on the upper frame assembly, and power drive means for selectively moving the upper frame assembly in a horizontal direction in a vertical direction, and for moving the lower frame assembly horizontally to selective positions whereby the trailers or containers are selectively moved from one location to another and finitely aligned thereat.

BRIEF DESCRIPTION OF THE DRAWING

The foregoing and other characteristics, objects, features and advantages of the present invention will become more apparent upon consideration of the following detailed description, having reference to the accompanying FIGURES. of the drawings, wherein:

FIG. 2 is a plan view of the upper frame assembly of the side shift grappler shown in FIG. 1.

FIG. 3 is a side elevational view of the upper frame assembly of the side shift grappler shown in FIG. 1.

DESCRIPTION OF A PREFERRED EMBODIMENT

Figure 1:
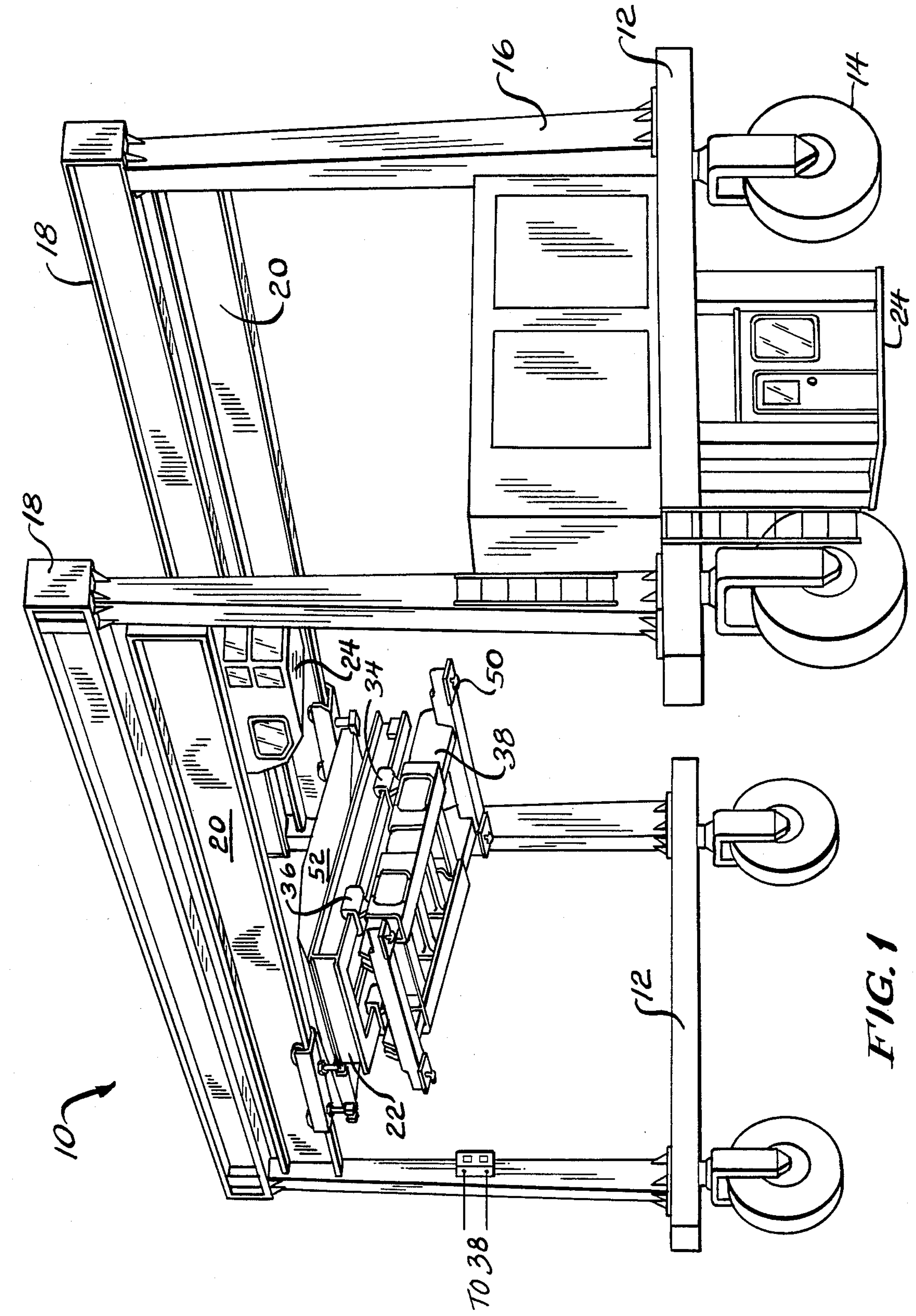
FIG. 1 is a perspective view of a crane apparatus including the side shift grappler of the invention.

Referring now to FIG. 1 there is shown a crane and lifting apparatus, generally indicated by reference numeral 10, capable of movement along ground level and of lifting and transporting one or more of a stack of trailers or large containers used in roadway, shipping or railroad transportation applications. The apparatus 10 includes a typical overhead bridge-like construction having a number of known features. The lower portion of the crane includes a pair of lower beams 12 supported by four pivotally attached wheel assemblies 14, selectively powered by drive means for moving the crane along ground level. Two upright corner beams 16 are disposed at outer ends of each lower beam 12 and in turn support at their upper ends the respective outboard ends of two bridge beams 18. The assembly thus described is effective to move along and span a transportation container workplace, a plurality of roadways or railroad tracks, and the like.

Directly underneath each of the bridge means 18 is a stabilizing beam 20 having its respective outer ends secured in suitable track or other slidable means on the upright corner beams 16. The stabilizing beams are powered by suitable drive means controlled by an operator and are adaptable for vertical movement as a unit up and down the corner beams 16.

An upper frame assembly 22 (FIGS. 2 and 3) is mounted for transverse movement at its outer ends along the underside of the stabilizing beams 20. The upper frame assembly 22 is powered by suitable drive means controlled by an operator from either of an operator's cab 24 disposed on opposite sides of the crane. Movement of the crane along ground level is, of course, also controlled by the operator from one or the other of the operator's cabs 24. The upper frame assembly 22 includes an upper side shift frame 26 disposed within the upper frame assembly 22. The upper side shift frame 26 comprises a first end 28 secured against movement in the upper frame assembly 22. A second end 30 of the side shift frame 26 is adaptable for rectilinear movement within the upper frame assembly 22 and is connected to the rigid first end 28 by a reciprocable cylinder 32 powered by suitable drive means controlled by an operator from one of the cabs 24. The upper frame assembly 22 includes two front sliding brackets 34 and two rear sliding brackets 36 adaptable for movement along the longitudinal lower flange of the side beams of the upper frame assembly 22. The two rear sliding brackets 36 are suitably secured to the movable second end 30 and are adaptable to move in unitary fashion therewith.

Figure 4:
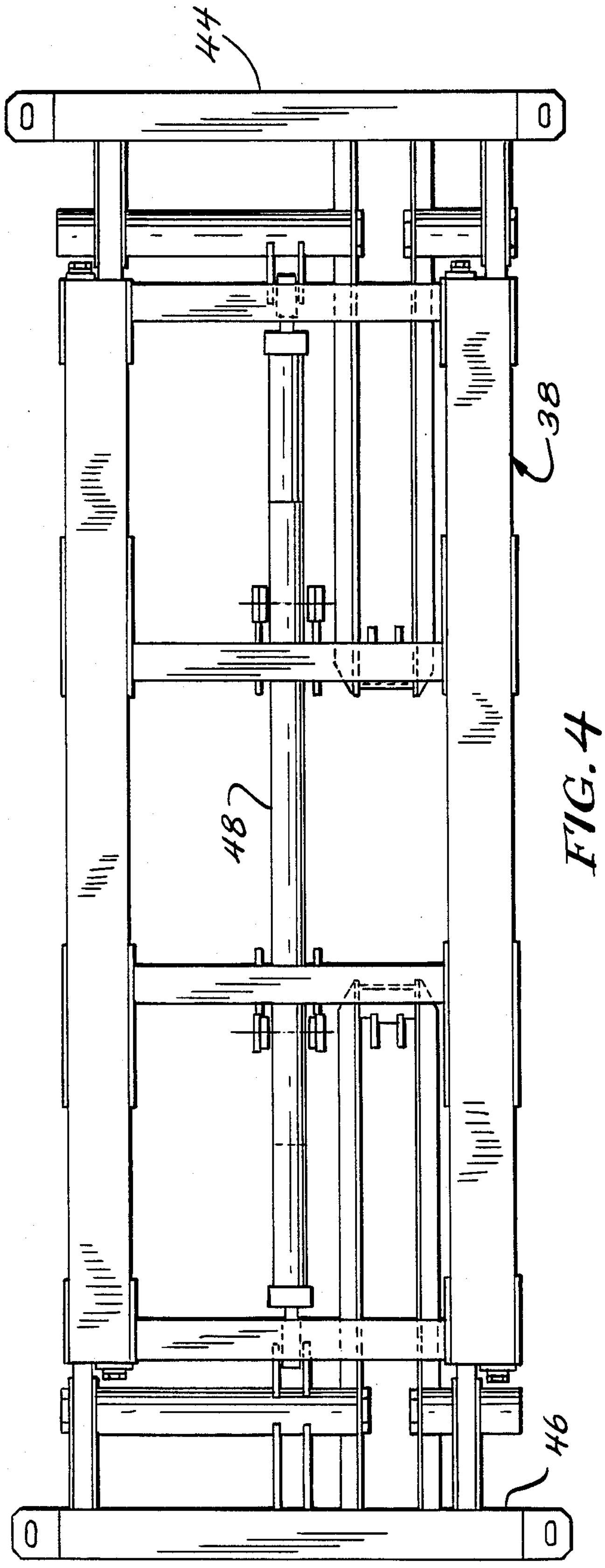
FIG. 4 is a plan view of the lower frame assembly of the side shift grappler shown in FIG. 1.

Depending from the upper frame assembly 22 and supported at four corners is a lower frame assembly 38 (FIGS. 4 and 5) adaptable for horizontal sliding movement along the underside of the upper frame assembly 22. The front sliding brackets 34 of the upper frame 22 are secured to respective front brackets 40 on the lower frame 38 and the rear sliding brackets 36 are secured to respective rear brackets 42 on the lower frame 38. Thus, it can be seen that the upper side shift frame when caused to move in a horizontal direction by its reciprocable cylinder 32 transfers reactive forces to the lower frame assembly 22 and causes it to move in a commensurate manner. Disposed at one end of the lower frame assembly 38 is a front sliding box adaptable for operation in a manner hereinafter described in more detail. Similarly, there is disposed at the other end of the frame assembly 38, a rear sliding box 46. An extension cylinder 48 is disposed within the lower frame assembly 38 for inward and outward movement of the front and rear sliding boxes 44 and 46 and is controlled by the operator from one or the other of the operator's cabs 24.

Figure 5:
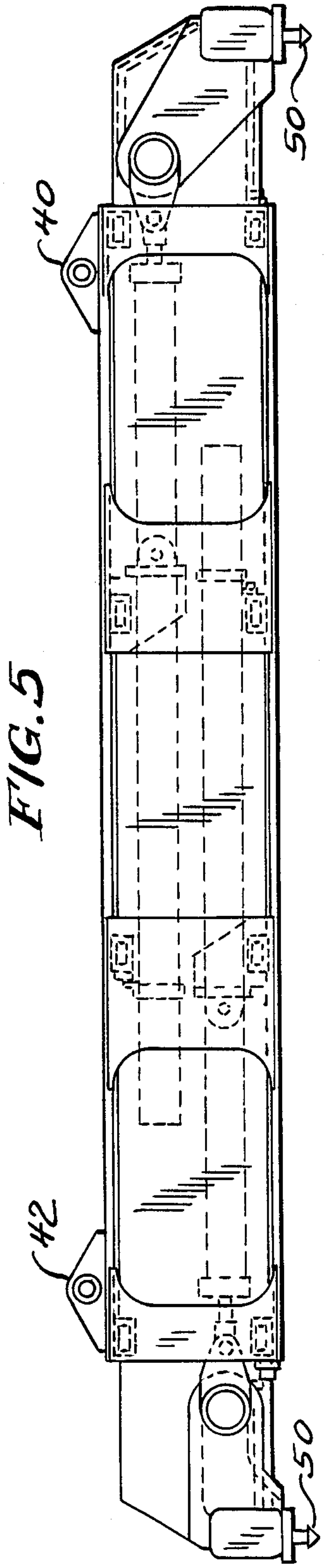
FIG. 5 is a side elevational view of the lower frame assembly of the side shift grappler shown in FIG. 1.

Referring to FIG. 5, there are disposed at four corners of the lower frame assembly suitable attachment means 50 for connecting with and supporting securely a container at its four corners.

It should be noted that there is provided between the underside of the stabilizing beams 20 and the upper frame assembly 22 a pivot beam assembly 52 that is adaptable for rotational adjustment of the upper and lower frame assemblies.

In operation of the crane and lifting apparatus of the invention, the structure may be moved along ground level to be positioned over a plurality of roads or tracks on which are located one or more trailer containers disposed singly or in stacks adjacent to each other. If the containers are stacked to a high level, the lower frame assembly 38 is moved to an upper most position just underneath the upper frame assembly 22. The attachment means 50 are then secured to the container to be transported and the container is then lifted off the stack. The upper frame assembly is then suitably moved transversely, if it is desired to move the container to an adjacent parallel location. If the movement of the container is to be toward another location that is tandemly oriented, the crane is moved along ground level. It can be seen that the crane and lifting apparatus is adaptable to transport the container in any one of three directions; namely, longitudinal, transversal, or vertical movement.

When it is desired to pick up a container that is on ground level, the upper frame assembly 38 is moved to a location substantially overhead the ground level container. The stabilizing beams 20 and the upper frame assembly are then lowered to an elevation just above the level of the container. The frame assembly is then suitably lowered to close proximity of the container, the attachment means are affixed thereto, and the container is then adaptable to be raised to a desired level for transporting to an alternate location. In the preferred mode of operation the container is then moved to be positioned on a flat bed railroad car for mounting thereon. When the container has been placed on the railroad car, there is a need for additional rectilinear movement on the railroad car so as to align the fifth wheel of the trailer truck container with the mounting stanchion of the railroad car. Thus, by operation of the side shift frame 26 the lower frame assembly 38 is caused to be positioned by slight incremental movements so that the fifth wheel and mounting stanchion can be properly aligned and secured thereat.

It will be noted that when the vertically moving stabilizing beams and upper frame assembly approach the top side of a stack of containers, there is provided automatic stop means for stopping the downward travel of the stabilizing beams. An electrical signal is then transmitted from the stabilizing beams main hoist in order that the lower frame assembly can be attached to the top of a ground level container.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A crane and lift apparatus including frame means having a pair of lower beams supporting four corner beams in turn supporting a pair of vertically movable upper stabilizing beams forming generally parallel track means transverse to said lower beams, wheel means rotatably supported beneath said frame means, drive means operatively coupled to said wheel means for causing movement of said frame means, upper frame assembly means movably mounted on said stabilizing beams for transverse movement therealong, lower frame assembly means movably to an underside portion of said upper frame assembly adaptable for longitudinal horizontal movement therealong and having longitudinally, slidable container attachment mean thereon power drive means operatively coupled to said drive means, said upper frame assembly and said lower frame assembly means, said power drive means acting selectively to operate said drive means to cause movement of said frame means, to move said upper frame assembly along said upper stabilizing beams, and to move said lower frame assembly means longitudinally along said upper frame assembly means for attaching to, carrying, positioning and releasing a container, operator control means connected to said power drive means for independently controlling the operations of said drive means, said upper frame assembly means and said lower assembly means, comprising side shift grappler means mounted within said upper frame assembly means for preselected incremental rectilinear movement therein as directed at times by said operator control means, said side shift grappler means comprising first end means fixedly mounted on said upper frame assembly means, second end means movably mounted on said upper frame assembly means for reciprocable movement therein, and retractable cylinder means connected between said first end means and said second end means for at times being effective to move said second end means toward and away from said first end means thereby to cause said lower frame assembly means when attached to said container to move a preselected incremental horizontal distance.

2. The crane and lift apparatus of claim 1 wherein said upper frame assembly means is movable in a horizontal direction at an uppermost level of the apparatus, and said lower frame assembly means is movable in a horizontal direction normal to that of the upper frame assembly so as to make a finite incremental adjustment for positioning said container.

3. The crane and lift apparatus of claim 1 wherein said upper frame assembly is effective to provide primary controlled incremental adjustment of horizontal movement of said container, and said lower frame assembly is effective to provide secondary controlled incremental horizontal movement of said container normal to the direction of said primary horizontal movement of said container.

4. The crane and lift apparatus of claim 1 wherein said lower frame assembly means comprises, front sliding box means having means for attachment to one end of said container, rear sliding box means having means for attachment to an other end of said container, and extension cylinder means for moving said front sliding box means toward or away from said rear sliding box means so as to position said lower frame assembly over and about said container for attachment thereto.

5. The crane and lift apparatus of claim 4 wherein said lower frame assembly and said attachment means are effective to provide a stable platform for controlled horizontal movement of said container.

6. The crane and lift apparatus of claim 1 comprising pivot beam assembly means disposed between said stabilizing beams and said upper frame assembly means adaptable for rotational adjustment of the upper and lower frame assembly means.

7. The crane and lift apparatus of claim 1 comprising automatic stop means for adjustably controlling downward travel of the stabilizing beams.

8. The crane and lift apparatus of claim 7 comprising electrical signal means operatively effective for indicating positioning of the lower frame assembly for attachment to said container.

* * * * *